Aug. 19, 1941.   E. W. SHAFER   2,252,900
PELLET FORMING APPARATUS
Filed Sept. 21, 1940
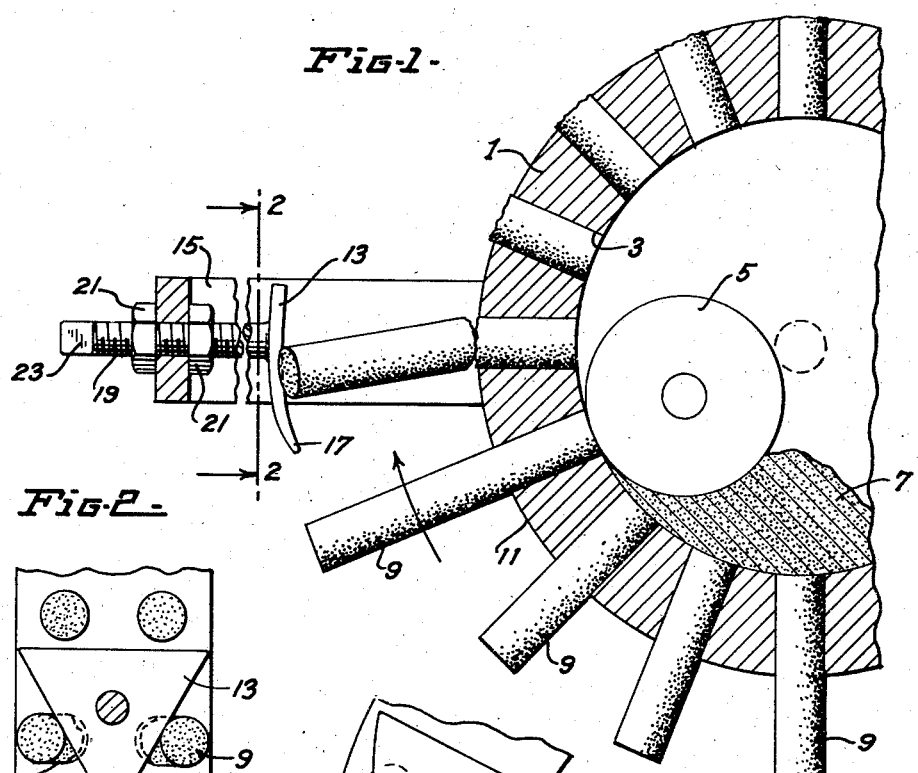
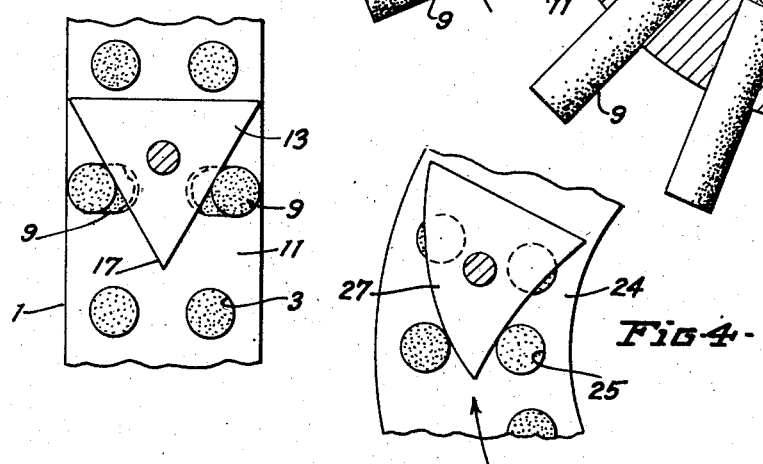
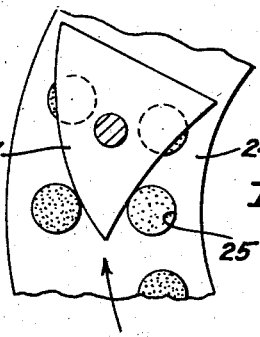
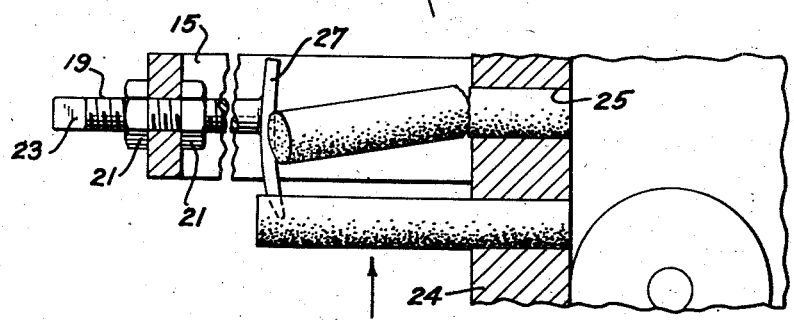
INVENTOR.
EUGENE W. SHAFER
BY Charles O. Bruce
ATTORNEY.

Patented Aug. 19, 1941

2,252,900

UNITED STATES PATENT OFFICE 2,252,900

PELLET FORMING APPARATUS

Eugene W. Shafer, North Hollywood, Calif., assignor to Edgar N. Meakin, San Francisco, Calif.

Application September 21, 1940, Serial No. 357,730

15 Claims. (Cl. 107—8)

My invention relates to pellet mills and more particularly to that portion of such mills in which the pellets are formed.

In mills commonly employed for the compaction of material, such as meal, chemicals, etc., into pellet form, the material is extruded through openings in a die, and emerges from such openings in the form of rods of such material in compacted form. Where the rods are of small crosssection and small pellets are desired, as in the preparation of chicken feed, a severing knife may be mounted with the cutting edge adjacent the discharge surface of the die, in a position to sever such rods when of the desired length. In the case of small pellets, such length is reached within a single revolution of die relative to the extruding member.

In the formation of pellets of greater length and size, as for example, in the preparation of cattle feed, more than one revolution of the die relative to the extrusion member is required in order to build up the extruded rod to the proper length suitable for severance. In such cases, severance of the rod cannot be accomplished, as in the previous manner through the use of a severing knife, for such rods would all be severed during the first revolution of the die, and would never have an opportunity to reach their proper length.

In accordance with present practice, therefore, it is customary to provide a breaker bar supported across the die, in a direction normal to the path of movement of the pellet rods and in spaced relationship to the discharge side of the die, such spaced relationship being sufficient to break off pellets when the pellet rods have reached proper length. This type of breaker bar, however, produces its results through striking the pellet rods a sharp blow as the two come together, and in many instances, such sudden blow produces a fracture of the rods at some intermediate point instead of at the base thereof. This may possibly be attributed to the fact that the stresses set up therein upon the sudden contact with the breaker bar, become concentrated at some intermediate point of weakness in the rod, instead of at the base where severance is desired.

This situation is additionally aggravated by the fact that the sudden blow of the breaker bar against the pellet rods is along the line of movement of such rods, resulting in the pellet rods being driven against the succeeding pellet rods approaching the breaker bar, thereby increasing the tendency for fractures to occur at points other than at the bases of the pellet rods. When such improperly fractured rods again approach the breaker bar for severance, they will then be somewhat in excess of the desired length. Accordingly, the output of present day machines employing breaker bars is not entirely uniform.

Among the objects of my invention are to provide a pellet mill of new design—

(1) In which fracturing of the pellet rods at undesired points is materially eliminated, (2) In which a higher degree of uniformity in the product of such mill is obtained, (3) In which crowding up or bunching of pellet rods during fracturing shall be avoided, and (4) In which the means for fulfilling the aforementioned objects shall be of very simple and rugged construction, and adjustable for the production of pellets of different lengths.

Additional objects of my invention will be brought out in the following description of the same taken in conjunction with the accompanying drawing wherein—

Figure 1 is a schematic, fragmentary showing of a pellet rod extruding apparatus with my improved fracturing means applied thereto.

Figure 2 is a view taken in the plane 2—2 of Figure 1, illustrating the manner in which my improved fracturing means operates.

Figures 3 and 4 are views corresponding to Figures 1 and 2, but illustrating my invention applied to pellet rod extruding apparatus of a slightly different form.

In general, my invention contemplates solving the problem of breakage of pellets during severance from the die, by applying to successive pellet rods, a gradually increasing pressure to a value sufficient to produce fracture thereof, such gradually increasing pressure being applied against such rods at the proper "length determining" distance from the discharge side of the die, and preferably, such pressure is directed against the pellet rods in a direction out of line with the axis of the row of die openings through which such pellet rods are extruded.

For a more detailed disclosure of my invention, reference will now be made to the accompanying drawing. In pellet mills of the type to which my invention is applicable, the pellet forming material is applied between an extrusion member and a die which is provided with suitable openings through which the material is extruded and from which it emerges in the form of pellet rods. Relative movement is provided between the extrusion member and the die. In some cases, such relative movement is obtainable by moving the die with respect to the extrusion member, by moving the extrusion member with respect to the die, or by moving both the extrusion member and the die with respect to each other. In some of these machines, the die is in the form of a cylindrical ring which is perforated with radial die openings, as in the patent to Meakin, No. 2,167,900; in others, the die may be in the form of a ring with the die openings through the sides thereof, as in the patent to Meakin, No. 1,954,086; while in still other types of machines, the die may take on other forms, such as that of a flat plate, etc. My invention is applicable to any of the above types of pellet mills.

In the embodiment of Figure 1, I have illustrated its application to that type of mill wherein the pellet forming mechanism includes a cylindrical die 1 with radial die openings 3 and an extrusion roller 5 operatively positioned with respect to this die. The number of rollers is, of course, immaterial to the invention, only one being illustrated in the embodiment under consideration. The die and extrusion roller are capable of relative movement with respect to each other, as in the Meakin Patent No. 2,167,900 for example, and pellet material 7 is introduced into the extrusion chamber formed by the die 1, where it is fed between the roller and the die, to be extruded through the openings, in the form of pellet rods 9. These rods increase in size during passage of the individual openings past the extrusion roller, and consequently, when it is desired to produce pellets of substantial length, more than one revolution of the die with respect to the roller, might be necessary.

To obtain uniformity in size, it is essential that each of the rods 9 be fractured at the base thereof, adjacent the discharge surface 11 of the die ring. In accordance with my invention, I provide a fracturing member, preferably in the form of a plate 13 of triangular shape. This plate is of a maximum width greater than the distance between two rows of the die openings, and is supported upon a bracket 15 in spaced relationship to the discharge surface of the die with an apex 17 thereof pointing in the direction of relative movement and midway between two rows of die openings. If the machine is of the type in which the die is rotatable with respect to the extrusion member, then the bracket will be attached to a stationary portion of the frame of the mill, and in the event that the die is held stationary, while the extrusion member is revolved, then the bracket will be mounted for movement with such extrusion member. During such relative movement, the triangular plate passes between adjacent rows, at first lightly engaging oppositely disposed rods, and then gradually spreading the same until fracture occurs. The effectiveness of my invention in causing fracture of the pellet rods at the bases thereof, and thereby obtaining a maximum uniformity in product, is attributed to the fact that the initial contact pressure between the fracturing plate and a pellet rod is very light, and while such pressure increases relatively rapidly to such value as produces fracture, such increase is a gradual one. This gradually increasing application of pressure is realized because of the triangular shape of the fracturing plate, which presents an edge to each pellet rod, across the path of movement thereof, and at such an angle thereto that the pressure applied to the rod must necessarily gradually increase to the breaking value.

At the same time, such pressure is applied in a direction out of line with the path of movement of the rod and thereby includes a lateral component. The stresses thus set up in the rod will concentrate at the base thereof, adjacent the discharge side of the die, and cause fracturing at that point; the rod, when fractured, being discharged to one side of the axis of its row of associated die openings, and will accordingly be discarded out of the path of the next oncoming rod. Thus, the interference due to bunching which occurs in the breaker bar type of fracturing member, is avoided in the operation of my improved fracturing means.

A contributing factor in the successful functioning of my invention resides in the twisting stresses imparted to each rod of pellet material by the frictional movement of the engaging edge of the plate 13 thereacross, which occurs simultaneously with the aforementioned pressure. This assures a clean break at the die surface and transmits a spinning movement to the severed pellet causing its hasty departure from the die surface into any suitable collecting means (not shown).

To accommodate the mill for the production of pellets of different sizes, the plate 13 is adjustably mounted in the bracket 15. To this end, the plate is provided with a threaded stem 19 which is threadedly mounted into the bracket and adapted to be locked at any point within its permissible range of adjustment, by lock nuts 21, one on each side of the bracket support and adapted to be tightened into engagement therewith. The end 23 of the stem 19 can be squared off to provide for engagement with a wrench to facilitate the making of such adjustments.

The embodiment depicted in Figures 3 and 4 illustrates my invention as applied to a pellet mill having a die in the form of a ring 23, with the die openings 25 extending through the sides thereof. When applied to a pellet mill having a die of this character, the fracturing plate 27 may be distorted slightly in shape, in a manner to apply equal pressure characteristics against the pellet rods of adjacent rows between which it travels, though this is not essential, in that the plate 13 of Figure 1 will function very satisfactorily in connection with a die of the type under consideration.

My invention is not necessarily limited in its application to a pair of rows of die openings, but may be adapted to the fracturing of pellet rods extruded from a single row of openings. In this connection, the triangular plate may be looked upon as the equivalent of two plates, each cooperating with a single row of openings to fracture the pellet rods extruded therefrom, as they reach proper size.

While I have described my invention in detail, it is apparent that the same is subject to change and modification, without departing from the principle thereof, and I accordingly do not desire to be limited in my protection to the specific details of my disclosure, except as may be necessitated by the prior art and the appended claims.

I claim:

1. Extrusion mill apparatus comprising a die having at least one row of aligned openings therein for the extrusion of rods of pellet material, and means supported in spaced relationship to the discharge side of said die for sequentially bearing against successive rods, in a direction out of line with the axis of said row.

2. Extrusion mill apparatus comprising a die having at least one row of aligned openings therein for the extrusion of rods of pellet material, means supported in spaced relationship to the discharge side of said die and having an edge crossing the axis of said row at an angle thereto, and means for producing relative movement between said first means and said die to cause said first means to sequentially bear against successive rods, in a direction out of line with the axis of said row.

3. Extrusion mill apparatus comprising a die having at least one row of aligned openings therein for the extrusion of rods of pellet material, and a plate supported in spaced relationship to the discharge side of said die and having an edge crossing the axis of said row at an angle thereto, and means for producing relative movement between said plate and said die to cause said plate to sequentially bear against successive rods, in a direction out of line with the axis of said row.

4. Extrusion mill apparatus comprising a die having at least one row of aligned openings therein for the extrusion of rods of pellet material, and a plate supported in spaced relationship to the discharge side of said die and having an edge crossing the axis of said row at an acute angle thereto, and means for producing relative movement between said plate and said die along the axis of said row to cause said plate to sequentially bear against successive rods, in a direction out of line with the axis of said row.

5. Extrusion mill apparatus comprising a die having a row of openings therein for the extrusion of rods of pellet material, and means for applying to the rods in said row, a gradually increasing pressure at a uniform distance from the bases thereof, said pressure increasing to a value sufficient to fracture said rods.

6. Extrusion mill apparatus comprising a die having a row of openings therein for the extrusion of rods of pellet material, and means for sequentially applying to successive rods in said row, a gradually increasing pressure at a uniform distance from the bases thereof, said pressure increasing to a value sufficient to fracture said rods.

7. Extrusion mill apparatus comprising a die having a row of openings therein for the extrusion of rods of pellet material, and means for applying to the rods in said row, a gradually increasing pressure in a direction at an angle to the axis of said row and at a uniform distance from the bases of said rods, said pressure increasing to a value sufficient to fracture said rods.

8. Extrusion mill apparatus comprising a die having a pair of rows of die openings therein for the forming of corresponding rows of rods of pellet material, and means supported in spaced relationship to the discharge side of said die for spreading said rods to the fracturing point thereof.

9. Extrusion mill apparatus comprising a die having a pair of rows of die openings therein for the forming of corresponding rows of rods of pellet material, and means passing between said rows in spaced relationship to the discharge side of said die for spreading said rods to the fracturing point thereof.

10. Extrusion mill apparatus comprising a die having a pair of rows of die openings therein for the extrusion of pellet forming material into rods of pellet material, and means of gradually increasing width, passing between said rows in spaced relationship to the discharge side of said die for spreading said rods to the fracturing point thereof.

11. Extrusion mill apparatus comprising a die having a pair of rows of die openings therein for the forming of corresponding rows of rods of pellet material, a substantially triangular shaped plate having a maximum width greater than the spacing between said rows and supported in spaced relationship to the discharge side of said die, and means for producing relative movement between said plate and said die in a direction causing said plate to pass between said rows of rods to spread said rods to the fracturing point thereof.

12. Extrusion mill apparatus comprising a die having a pair of rows of die openings therein for the forming of corresponding rows of rods of pellet material, a triangular shaped plate having a maximum width greater than the spacing between said rows and supported in spaced relationship to the discharge side of said die with an apex directed between said rows, and means for producing relative movement between said plate and said die in a direction causing said plate to pass between said rows of rods to spread said rods to the fracturing point thereof.

13. Extrusion mill apparatus comprising a die having a pair of rows of die openings therein for the forming of corresponding rows of rods of pellet material, a substantially triangular shaped plate having a maximum width greater than the spacing between said rows and supported in spaced relationship to the discharge side of said die with an apex directed between said rows, and means for producing relative movement between said plate and said die in a direction causing said plate to pass between said rows of rods with said apex leading, to gradually spread said rods to the fracturing point thereof.

14. Extrusion mill apparatus comprising a die having a pair of rows of die openings therein for the forming of corresponding rows of rods of pellet material, a substantially triangular shaped plate having a maximum width greater than the spacing between said rows and supported in spaced relationship to the discharge side of said die with an apex directed between said rows, means for producing relative movement between said plate and said die in a direction causing said plate to pass between said rows of rods with said apex leading, to spread said rods to the fracturing point thereof, and means for adjusting the spaced relationship of said plate with respect to the discharge side of said die.

15. Extrusion mill apparatus comprising a die having a row of openings therein for the extrusion of rods of pellet material and means for applying to the rods in said row, a gradually increasing pressure and a simultaneous twisting force at a distance from the bases thereof.

EUGENE W. SHAFER.